United States Patent
Cho et al.

(10) Patent No.: US 8,891,367 B2
(45) Date of Patent: Nov. 18, 2014

(54) METHOD FOR ALLOCATING UPLINK RESOURCES USING QOS PARAMETER

(75) Inventors: Hee Jeong Cho, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 505 days.

(21) Appl. No.: 13/119,668

(22) PCT Filed: Sep. 18, 2009

(86) PCT No.: PCT/KR2009/005325
§ 371 (c)(1),
(2), (4) Date: Apr. 12, 2011

(87) PCT Pub. No.: WO2010/032985
PCT Pub. Date: Mar. 25, 2010

(65) Prior Publication Data
US 2011/0205993 A1      Aug. 25, 2011

Related U.S. Application Data

(60) Provisional application No. 61/097,874, filed on Sep. 18, 2008.

(30) Foreign Application Priority Data

Nov. 25, 2008  (KR) .................. 10-2008-0117316
Mar. 25, 2009  (KR) .................. 10-2009-0025623

(51) Int. Cl.
H04L 12/26      (2006.01)
H04W 72/12     (2009.01)
H04B 1/44        (2006.01)
H04W 72/14     (2009.01)

(52) U.S. Cl.
CPC .......... *H04W 72/1236* (2013.01); *H04W 72/14* (2013.01)
USPC ......................................... 370/230; 370/282

(58) Field of Classification Search
USPC .......................................................... 370/329
See application file for complete search history.

(56) References Cited

U.S. PATENT DOCUMENTS

| | | | | |
|---|---|---|---|---|
| 6,785,252 | B1 * | 8/2004 | Zimmerman et al. | 370/337 |
| 8,335,184 | B2 * | 12/2012 | Okuda | 370/329 |
| 2007/0104221 | A1 * | 5/2007 | Venkatachalam | 370/468 |
| 2008/0159334 | A1 | 7/2008 | Venkatachalam et al. | |
| 2008/0317033 | A1 * | 12/2008 | Lee et al. | 370/393 |
| 2009/0116436 | A1 * | 5/2009 | Okuda | 370/329 |
| 2009/0161650 | A1 * | 6/2009 | Imamura et al. | 370/342 |

FOREIGN PATENT DOCUMENTS

EP       1 940 185 A1       7/2008
EP       1940185 A1   *    7/2008

* cited by examiner

*Primary Examiner* — Eunsook Choi
(74) *Attorney, Agent, or Firm* — Birch, Stewart, Kolasch & Birch, LLP

(57) ABSTRACT

A method for allocating uplink resources using information of a Bandwidth Request (BR) indicator in a Base Station (BS), and which includes receiving a BR indicator including a station Identifier (ID), and a Quality of Service (QoS) parameter from a Mobile Station (MS); estimating uplink resources based on the BR indicator and allocating the estimated uplink resources to the MS, and if there are a plurality of connections for the MS, the estimating includes deciding one QoS parameter to be used to estimate the uplink resources among a plurality of QoS parameters corresponding to the connections; and transmitting information about the allocated uplink resources to the MS through an uplink grant message.

6 Claims, 13 Drawing Sheets

METHOD FOR ALLOCATING UPLINK RESOURCES USING QOS PARAMETER

TITLE OF THE INVENTION

This application is the National Phase of PCT/KR2009/005325 filed on Sep. 18, 2009, which claims priority under 35 U.S.C. 119(e) to U.S. Provisional Application No. 61/097,874 filed on Sep. 18, 2008 and under 35 U.S.C. 119(a) to Patent Application No. 10-2008-0117316 filed in Korea on Nov. 25, 2008 and to Patent Application No. 10-2009-0025623 filed in Korea on Mar. 25, 2009 all of which are hereby expressly incorporated by reference into the present application.

BACKGROUND ART

1. Field of the Invention

The present invention relates to a method for minimizing the overhead of an UpLink (UL) allocation request transmitted for allocation of UL resources.

2. Discussion of the Related Art

In a conventional broadband wireless access system, a Mobile Station (MS) requests a UL bandwidth in a random access procedure illustrated in FIG. 1.

Referring to FIG. 1, the MS determines a Bandwidth Request (BR) code and transmits the BR code to a Base Station (BS) in step 110. Upon receipt of the BR code from the MS, the BS allocates UL resources to the MS, for use in transmission of a BandWidth REQuest (BW-REQ) message from the MS in step 120. If the MS fails to be allocated the UL resources until expiration of its timer (contention-based reservation timeout or T3) activated after the BW code transmission, it retransmits the BR code.

In step 130, the MS transmits a BW-REQ message through the allocated UL resources to the BS. Upon receipt of the BW-REQ message, the BS allocates UL resources to the MS in step 140. Finally, the MS transmits data through the allocated UL resources in step 150.

In the broadband wireless access system, the MS may request a UL bandwidth by using a random access procedure illustrated in FIG. 2. The BS may support both a 5-step regular access procedure (steps 210 to 250) and a 3-step quick access procedure (steps 210, 240 and 250).

The 5-step regular access procedure may be used independently of the 3-step quick access procedure or as an alternative to the 3-step quick access procedure.

In the 3-step quick access procedure, the MS transmits a BR indicator including UL BR information (e.g. an MS Identifier (ID), information about a BR size, etc.) to the BS in step 210. Upon receipt of the BR indicator, the BS allocates UL resources to the MS in step 240. In step 250, the MS transmits data through the allocated UL resources. Also, the MS may transmit additional UL BR information.

In the 5-step regular access procedure, the MS transmits a BR indicator in step 210. Upon receipt of the BR indicator, the BS allocates UL resources to the MS, for use in transmission of a BW-REQ message from the MS in step 220. In step 230, the MS transmits a BW-REQ message through the allocated UL resources. Upon receipt of the BW-REQ message, the BS allocates UL resources to the MS in step 240 and the MS transmits data through the allocated UL resources in step 250. Here, the MS may transmit additional UL BR information.

In the conventional broadband wireless access system, the MS transmits information required for resource allocation along with a BR code, for fast allocation of UL resources. The information may include a station ID, a Quality of Service (QoS) level, a BR size, etc. The BS determines a UL resource area (size) to be allocated, taking into account the amount of information to be transmitted and a predicted maximum number of MSs, because it cannot estimate the number of MSs requesting resource allocation at a specific point of time and the same number of MSs do not request resource allocation every time. The MS may also transmit UL BR information (e.g. a station ID, a BR size, etc.) by a BW-REQ message, occupying as much UL resources as the amount of the UL BR information. Accordingly, there exists a need for a method for minimizing the amount of information to be transmitted without affecting a resource allocation procedure in order to reduce resources (overhead) taken for UL resource allocation.

SUMMARY OF THE INNVENTION

An object of the present invention devised to solve the problem lies on a UL resource allocation method for minimizing the overhead of a UL allocation request transmitted for allocation of UL resources.

Technical problems to be solved in the present invention are not restricted to the above-described problems and other technical problems which are not mentioned will definitely be understood by those skilled in the art from the following description.

The object of the present invention can be achieved by providing a method for allocating uplink resources using information of a BR indicator in a BS, including receiving a BR indicator including a station ID and a QoS parameter from an MS, estimating uplink resources to be allocated to the MS using the station ID and the QoS parameter, and transmitting information about the estimated uplink resources to the MS through an uplink grant message.

The QoS parameter may be a grant scheduling type for one of connections established for the MS. If there are a plurality of connections for the grant scheduling type, a minimum value or a maximum value of uplink resources estimated for the connections may be calculated. Or, if there are a plurality of connections for the grant scheduling type, an average of uplink resources estimated for the connections may be calculated.

In another aspect of the present invention, provided herein is a method for allocating uplink resources using information of a BW-REQ message in a BS, including allocating uplink resources to an MS, for transmission of a BW-REQ message from the MS, upon receipt of a BR indicator from the MS, receiving a BW-REQ message including a station ID and a QoS parameter from the MS, estimating uplink resources to be allocated to the MS using the station ID and the QoS parameter, and transmitting information about the estimated uplink resources to the MS through an uplink grant message.

The QoS parameter may be a grant scheduling type for one of connections established for the MS. If there are a plurality of connections for the grant scheduling type, a minimum value or a maximum value of uplink resources estimated for the connections may be calculated. Or, if there are a plurality of connections for the grant scheduling type, an average of uplink resources estimated for the connections may be calculated.

In another aspect of the present invention, provided herein is a method for allocating uplink resources using information of a BR indicator in a BS, including receiving a BR indicator including a station ID, a QoS parameter, and a BR size field from an MS, estimating uplink resources corresponding to the station ID and the QoS parameter using the BR size field and allocating the estimated uplink resources to the MS, and transmitting information about the allocated uplink resources to the MS through an uplink grant message.

During the uplink resources estimation, the amount of resources corresponding to the station ID and the QoS parameter may be calculated using size information indicated by the BR size field.

During the uplink resource estimation, a size indicated by the size information of the BR size field may be added to or subtracted from the amount of resources estimated based on the station ID and the QoS parameter.

In a further aspect of the present invention, provided herein is a method for allocating uplink resources using information of a BW-REQ message in a BS, including allocating uplink resources to an MS, for transmission of a BW-REQ message from the MS, upon receipt of a BR indicator from the MS, receiving a BW-REQ message including a station ID, a QoS parameter, and a BR size field from the MS, estimating uplink resources corresponding to the station ID and the QoS parameter using the BR size field and allocating the estimated uplink resources to the MS, and transmitting information about the allocated uplink resources to the MS through an uplink grant message.

During the uplink resources estimation, the amount of resources corresponding to the station ID and the QoS parameter may be calculated using size information indicated by the BR size field.

During the uplink resource estimation, a size indicated by the size information of the BR size field may be added to or subtracted from the amount of resources estimated based on the station ID and the QoS parameter or subtracting the size indicated by the size information of the BR size field from the amount of resources estimated based on the station ID and the QoS parameter.

According to exemplary embodiments of the present invention, the overhead of a UL allocation request transmitted for allocation of UL resources is minimized. When additional information such as a BR size, etc. is used, resources are efficiently allocated.

Advantageous effects obtained in the present invention are not restricted to the above-described effects and other effects which are not mentioned will definitely be understood by those skilled in the art from the following descript.

DESCRIPTION OF THE DRAWINGS

The accompanying drawings, which are included to provide a further understanding of the invention, illustrate embodiments of the invention and together with the description serve to explain the principle of the invention.

In the drawings.

DESCRIPTION OF THE EMBODIMENTS OF THE INVENTION

Figure 1:
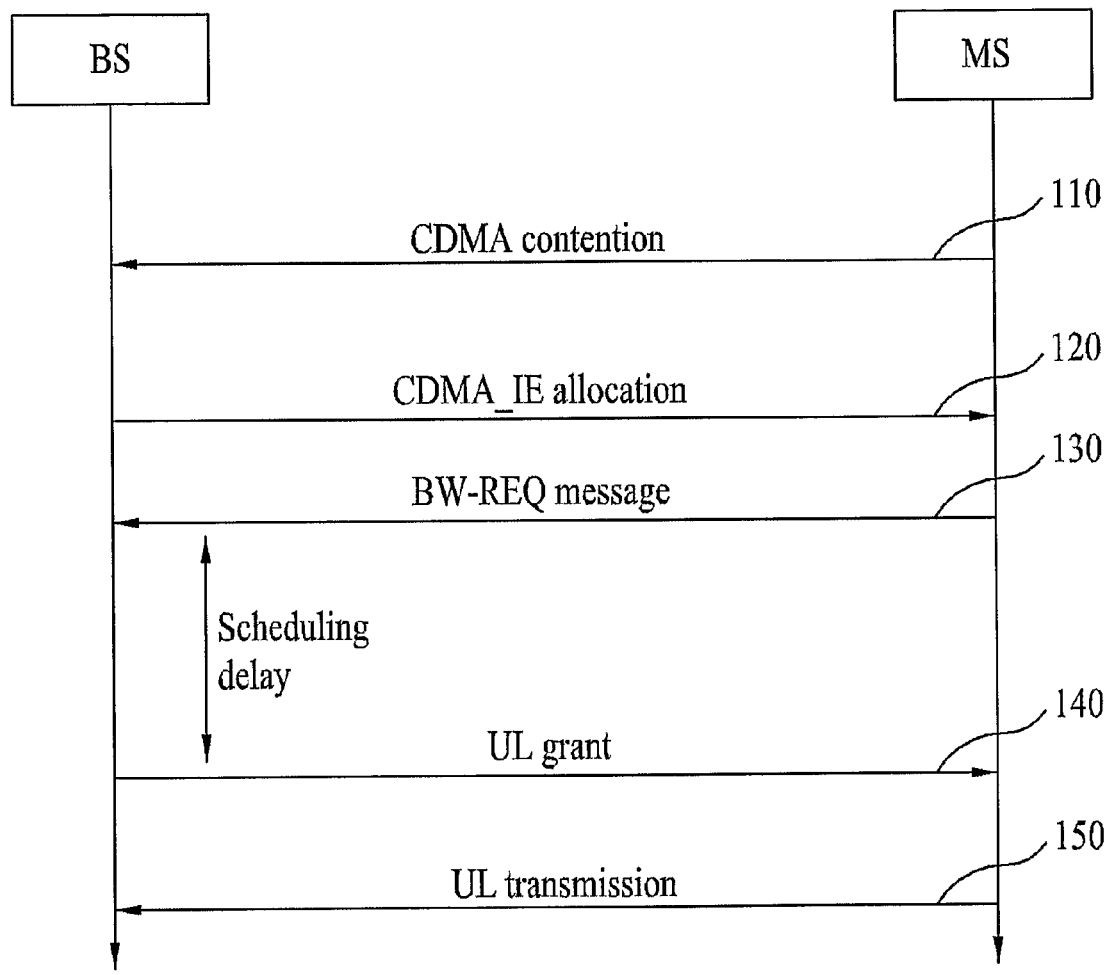
FIG. 1 illustrates a conventional method for requesting UL resources by random access in an MS in a broadband wireless access system.
Figure 2:
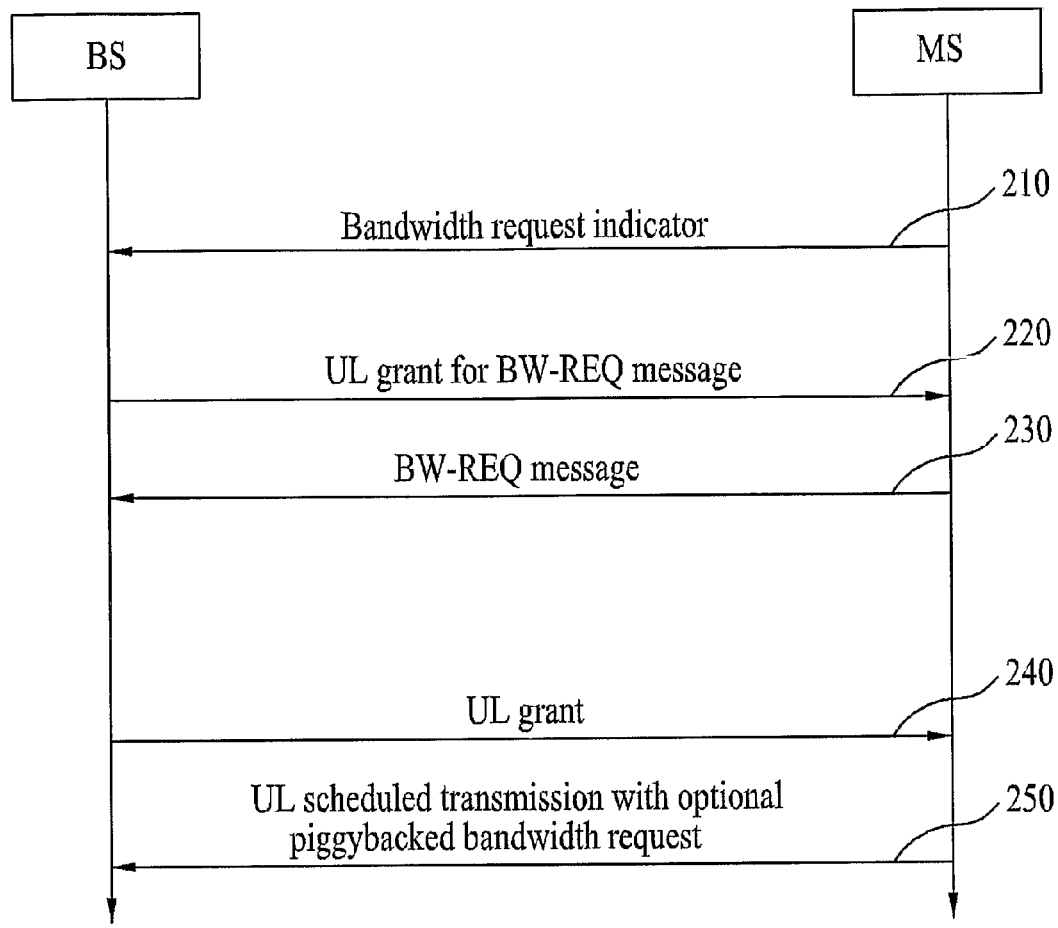
FIG. 2 illustrates another conventional method for requesting UL resources by random access in an MS in the broadband wireless access system.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may ruin the substance of the present invention, are not explained. And, procedures or steps, which can be understood by those skilled in the art, are not explained as well.

In exemplary embodiments of the present invention, a description is made of a data transmission and reception relationship between a Base Station (BS) and a Mobile Station (MS). Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B' (eNB), 'Advanced BS (ABS)', 'access point', etc. The term 'MS' may be replaced with the term 'User Equipment (UE)', 'Mobile Subscriber Station' (MSS), 'Advanced MS (AMS)', 'mobile terminal', etc.

A transmitter means a node that transmits voice or data service and a receiver means a node that receives voice or data service. Hence, an MS may be a transmitter and a BS may be a receiver, on uplink. Likewise, the MS may be a receiver and the BS may be a transmitter, on downlink.

Meanwhile, the MS (or terminal) may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.)

Exemplary embodiments of the present invention may be achieved by various means, for example, hardware, firmware, software, or a combination thereof.

In a hardware configuration, methods for allocating UpLink (UL) using a Quality of Service (QoS) parameter according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

Exemplary embodiments of the present invention are supported by standard documents disclosed for at least one of wireless access systems including Institute of Electronics and Electrical Engineers (IEEE) 802 systems, a $3^{rd}$ Generation Project Partnership (3GPP) systems, a 3GPP Long Term Evolution (LTE) systems, and a 3GPP2 system. In particular, the steps or parts, which are not described to clearly reveal the technical idea of the present invention, in the embodiments of the present invention may be supported by the above documents. All terminologies used herein may be supported by at least one of P802.16-2004, P802.16e-2005, and P802.16Rev2 documents which are the standards of IEEE 802.16.

Now a detailed description will be made of preferred embodiments of the present invention with reference to the accompanying drawings. The following detailed description presented with reference to the accompanying drawings is intended to describe not the only embodiment of the present invention but exemplary embodiments of the present invention.

Specific terms used for the embodiments of the present invention are provided to help the understanding of the present invention. These specific terms may be replaced with other terms within the scope and spirit of the present invention.

Now a description will be made of a method for requesting UL resources using a minimum amount of resource request information in a Mobile Station (MS) and a method for allocating UL resources based on the resource request information in a Base Station (BS). The UL resource request method and the UL resource allocation method are applicable when the MS requests UL resources by a Bandwidth Request (BR) indicator, when the MS requests UL resources by a BandWidth-REQuest (BW-REQ) message, or when the MS requests UL resources over another control channel (e.g. a Fast Feedback CHannel (FFCH)).

Figure 3A:
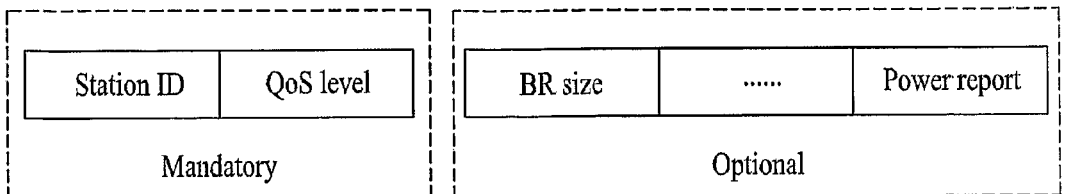
FIG. 3A illustrates resource request information transmitted to request UL resources according to an exemplary embodiment of the present invention.

FIG. 3A illustrates resource request information transmitted to request UL resources according to an exemplary embodiment of the present invention.

Referring to FIG. 3A, an MS basically transmits a station Identifier (ID) and a Quality of Service (QoS) level (or a QoS ID or QoS index indicating the QoS level) to request UL resources. Optionally, the MS may also transmit information including a BR size, etc. If the MS requests UL resources in non-contention mode, it does not need to transmit the station ID because the MS requests the UL resources using a BR code received from a BS and the BS identifies the MS by the BR code.

If the MS transmits only the basic information (i.e. the station ID and the QoS level), the BS allocates as much resources as estimated based on a QoS parameter of an active connection(s) corresponding to the QoS level of the MS set in the received basic information, for example, a maximum sustained traffic rate, an unsolicited polling interval, a default bit rate, or the like defined in IEEE 802.16.

Figure 3B:
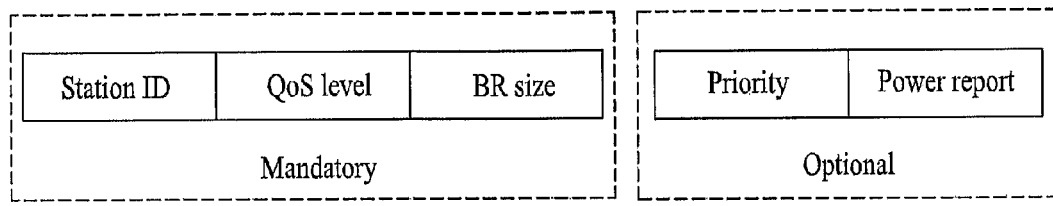
FIG. 3B illustrates resource request information transmitted to request UL resources according to another exemplary embodiment of the present invention.

FIG. 3B illustrates resource request information transmitted to request UL resources according to another exemplary embodiment of the present invention.

Referring to FIG. 3B, because the MS basically transmits a BR size, it may request a bandwidth more accurately. Optionally, the MS may transmit a Priority, a Power report, etc.

Exemplary embodiments of the present invention as described below are based on the assumption that only a grant scheduling type is taken into account as a factor that determines a QoS level and the MS operates in contention mode. However, those skilled in the art will appreciate that a QoS parameter is not limited to a grant scheduling type.

Figure 4:
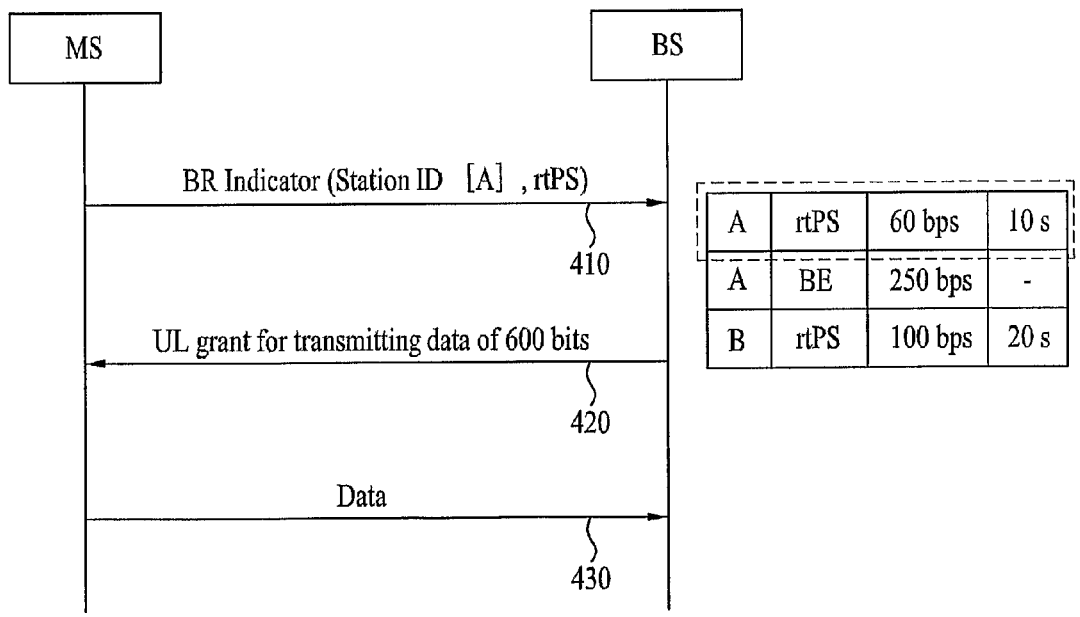
FIG. 4 is a diagram illustrating a signal flow for a UL resource allocation method when there is only a single connection corresponding to resource request information received from an MS in a 3-step quick access procedure according to an exemplary embodiment of the present invention.

FIG. 4 is a diagram illustrating a signal flow for a UL resource allocation method when there is only a single connection corresponding to resource request information received from an MS in a 3-step quick access procedure according to an exemplary embodiment of the present invention.

Referring to FIG. 4, the MS transmits a BR indicator to the BS to transmit real-time Polling Service (rtPS) data through step 410.

Upon receipt of the BR indicator, the BS determines connections established for the MS by checking a station ID in the BR indicator. The BS then allocates UL resources to the MS using QoS parameters of the connections. In the illustrated case of FIG. 4, the MS has a station ID of A and a connection with an rtPS grant scheduling type and a connection with a Best Effort (BE) grant scheduling type. The BS allocates UL resources to the MS using a QoS parameter of the former connection (i.e. the rtPS connection) in step 420. Since 60 bits of data is transmitted per second via the rtPS connection, it may be estimated that 600 bits are transmitted per 10 seconds via the rtPS connection.

Finally, the MS transmits data through the allocated UL resources in step 430.

Figure 5:
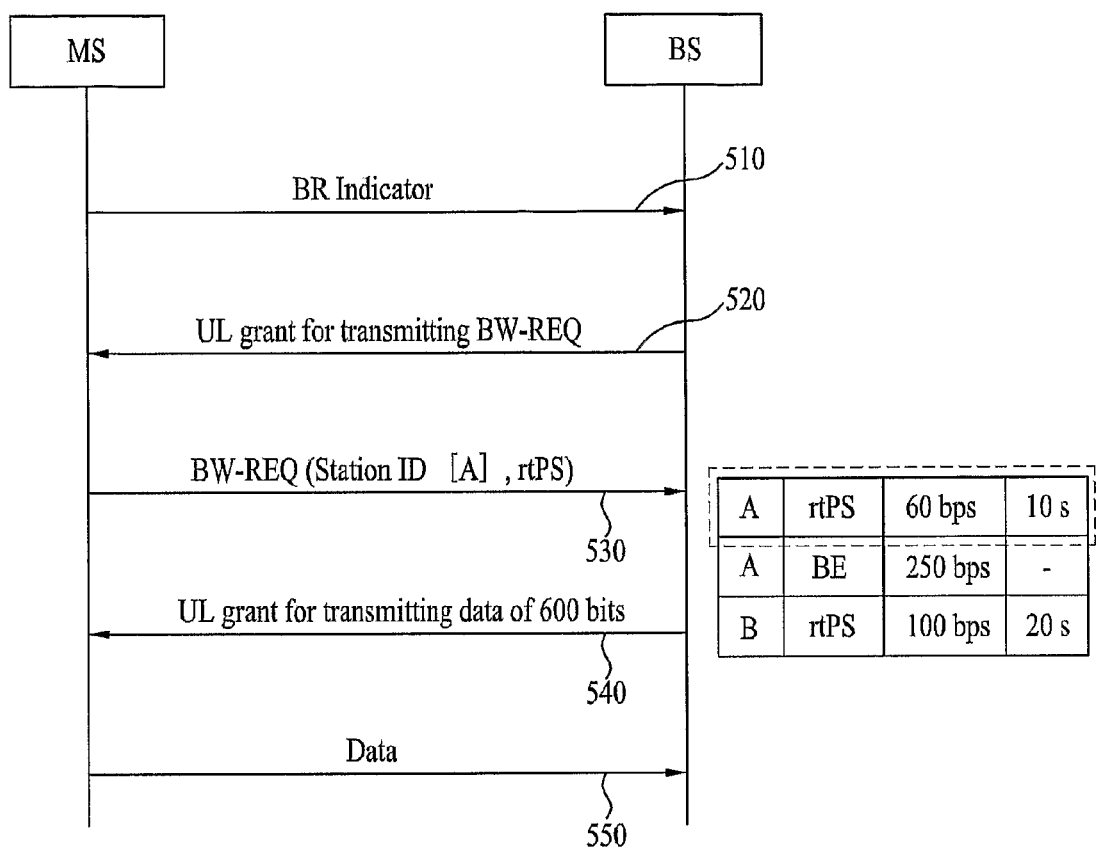
FIG. 5 is a diagram illustrating a signal flow for a UL resource allocation method when there is only a single connection corresponding to resource request information received from an MS in a 5-step regular access procedure according to an exemplary embodiment of the present invention.

FIG. 5 is a diagram illustrating a signal flow for a UL resource allocation method when there is only a single connection corresponding to resource request information received from an MS in a 5-step regular access procedure according to an exemplary embodiment of the present invention.

Referring to FIG. 5, the MS transmits a BR indicator to the BS to request UL resources in step 510. Upon receipt of the BR indicator, the BS allocates UL resources to the MS, for use in transmission of a BW-REQ message from the MS in step 520. Then the MS transmits a BW-REQ message through the allocated UL resources to the BS to transmit rtPS data through step 530. The BS determines connections established for the MS by comparing station IDs. The BS allocates UL resources based on QoS parameters of the connections. In the illustrated case of FIG. 5, the MS with a station ID of A has a connection with rtPS as a grant scheduling type and a connection with BE as a grant scheduling type. The BS allocates UL resources to the MS using a QoS parameter of the former connection (i.e. the rtPS connection) in step 540. Since 60 bits of data is transmitted per second via the rtPS connection, it may be estimated 600 bits are transmitted per 10 seconds via the rtPS connection.

Finally, the MS transmits data through the allocated UL resources in step 550.

Figure 6:
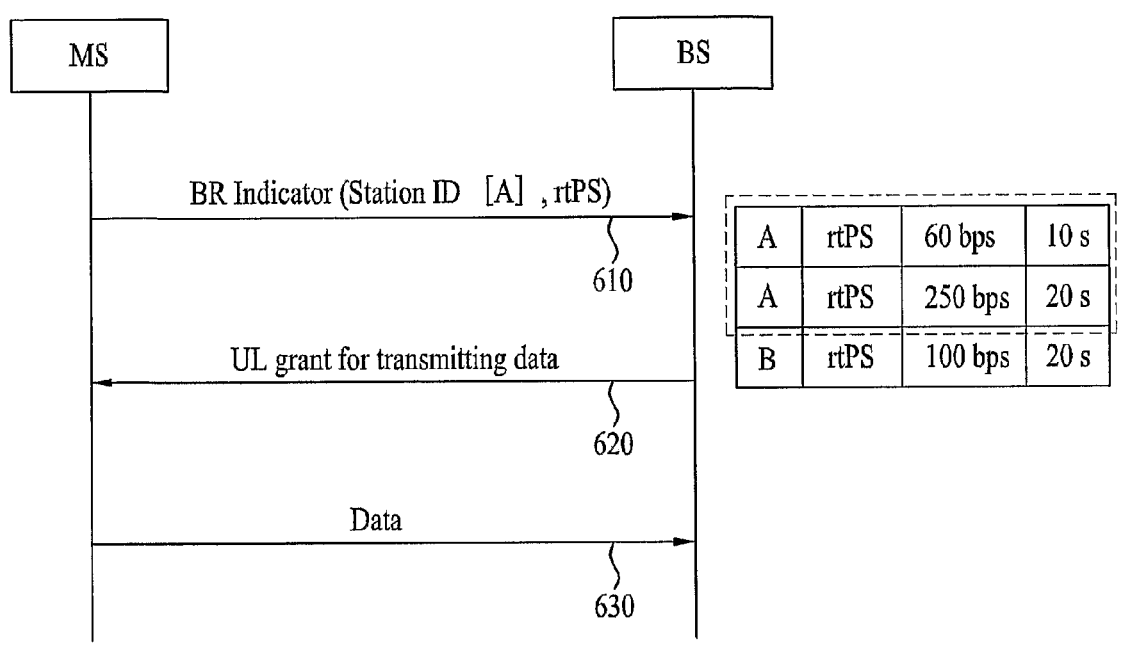
FIG. 6 is a diagram illustrating a signal flow for a UL resource allocation method when there is a plurality of connections corresponding to resource request information received from an MS in the 3-step quick access procedure according to an exemplary embodiment of the present invention.

FIG. 6 is a diagram illustrating a signal flow for a UL resource allocation method when there is a plurality of connections corresponding to resource request information received from an MS in the 3-step quick access procedure according to an exemplary embodiment of the present invention.

Referring to FIG. 6, the MS transmits a BR indicator to the BS to transmit rtPS data in step 610.

Upon receipt of the BR indicator, the BS determines connections established for the MS by checking a station ID in the BR indicator.

The BS then allocates UL resources to the MS using QoS parameters of the connections. In this case, a decision needs to be made as to a connection of which a QoS parameter is to be used. The decision may be made in the following three ways.

$$\text{Minimum estimated size} = \text{MIN}(\text{connection 1}, \text{connection 2}, \ldots, \text{connection } n)$$

$$\text{Maximum estimated size} = \text{Max}(\text{connection 1}, \text{connection 2}, \ldots, \text{connection } n)$$

$$\text{Average estimated size} = \text{AVG}(\text{connection 1}, \text{connection 2}, \ldots, \text{connection } n) \quad \text{[Equation 1]}$$

In the illustrated case of FIG. 6, the MS has a station ID of A and two connections with rtPS as a grant scheduling type exist for the MS. Accordingly, the BS allocates UL resources to the MS using QoS parameters of the rtPS connections in step 620. Herein, the BS may allocate UL resources for transmission of data of 600 bits (minimum estimated size), 5000 bits (maximum estimated size) or 2800 bits (average estimated size).

Finally, the MS transmits data through the allocated UL resources in step 630.

Figure 7:
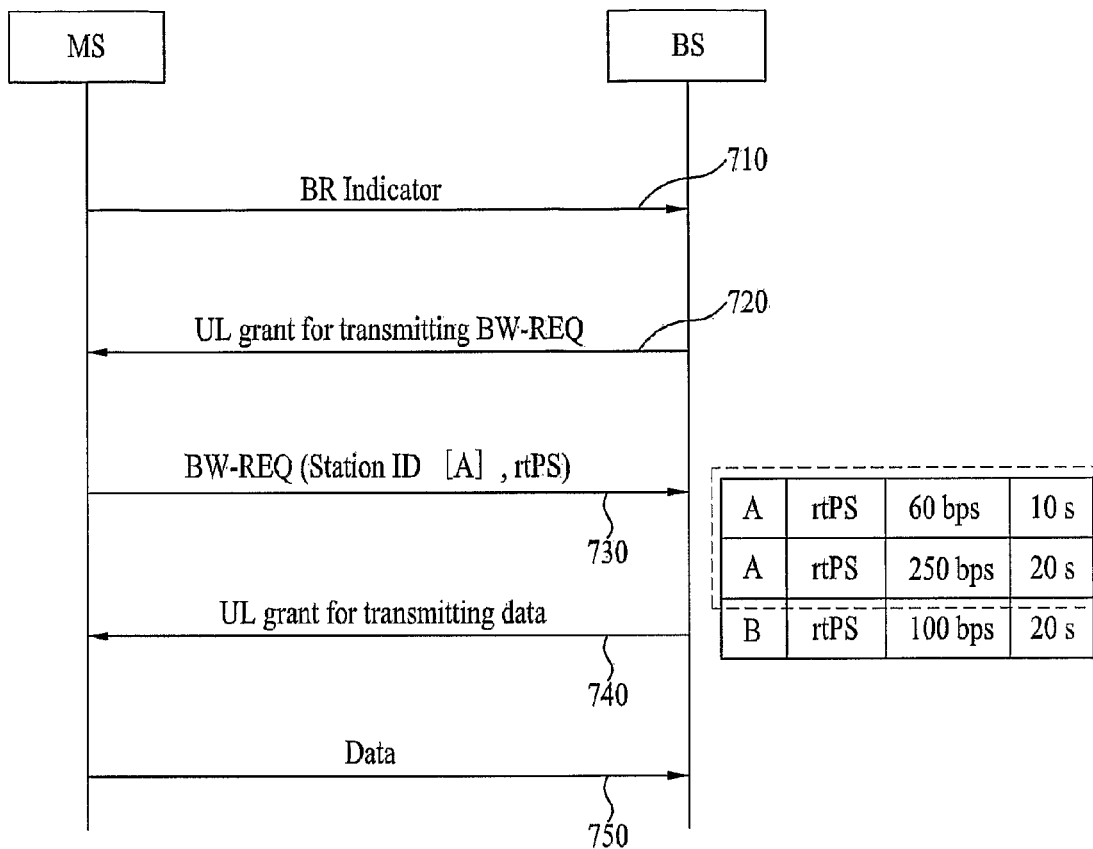
FIG. 7 is a diagram illustrating a signal flow for a UL resource allocation method when there are a plurality of connections corresponding to resource request information received from an MS in the 5-step regular access procedure according to an exemplary embodiment of the present invention.

FIG. 7 is a diagram illustrating a signal flow for a UL resource allocation method when there are a plurality of connections corresponding to resource request information received from an MS in the 5-step regular access procedure according to an exemplary embodiment of the present invention.

Referring to FIG. 7, the MS transmits a BR indicator to the BS to request UL resources in step 710. Upon receipt of the BR indicator, the BS allocates UL resources to the MS, for use in transmission of a BW-REQ message from the MS in step 720. Then the MS transmits a BW-REQ message through the allocated UL resources to the BS to transmit rtPS data in step 730.

The BS determines connections established for the MS by the station ID of the MS. The BS allocates UL resources based on QoS parameters of the connections. In the illustrated case of FIG. 7, the MS has a station ID of A and two connections with rtPS as a grant scheduling type.

The BS allocates UL resources to the MS using QoS parameters of the rtPS connections in step 740. Herein, the BS may allocate UL resources for transmission of data of 600 bits (minimum estimated size), 5000 bits (maximum estimated size) or 2800 bits (average estimated size).

Finally, the MS transmits data through the allocated UL resources in step 750.

In accordance with another exemplary embodiment of the present invention, it is assumed that the MS transmits optional information such as a BR size along with basic information (i.e. a station ID and a QoS level).

Figure 8:
FIG. 8 illustrates exemplary structures of a BR field according to the types of the BR field.
Figure 8:

A BR size field may be designed to be Type 1 or Type 2 as illustrated in FIG. 8.

Referring to FIG. 8, a Type field identifies the type of the BR size field, indicating a BR size increase or decrease, or an aggregate BR size.

A Sign field indicates whether an estimated size should be increased by an increment indicated by a Size field or the estimated size should be decreased by a decrement indicated by the Size field.

The Size field provides the increment or decrement value, or a requested size itself. Various expressions are available to represent the Size field. In case of general expression, the value of information bits in the Size field is interpreted as it is (e.g. "110"→"6"). In case of power expression, the value of information bits is interpreted as a power of a specific number x (e.g. "110"→"$2^6$" if x is 2). In case of step expression, the value of information bits is interpreted as to be multiplied by a predetermined value (e.g. "110"→"5×6=30" if the predetermined value is 5).

For example, the BS may allocate UL resources to the MS, taking into account a resource size estimated based on the basic information and the optional BR size information (Type 1, Increase/Decrease). Alternatively, the BS may allocate UL resources to the MS, neglecting the size estimated based on the basic information and instead, taking into account the optional BR size information only (Type 2, Aggregate).

Figure 9:
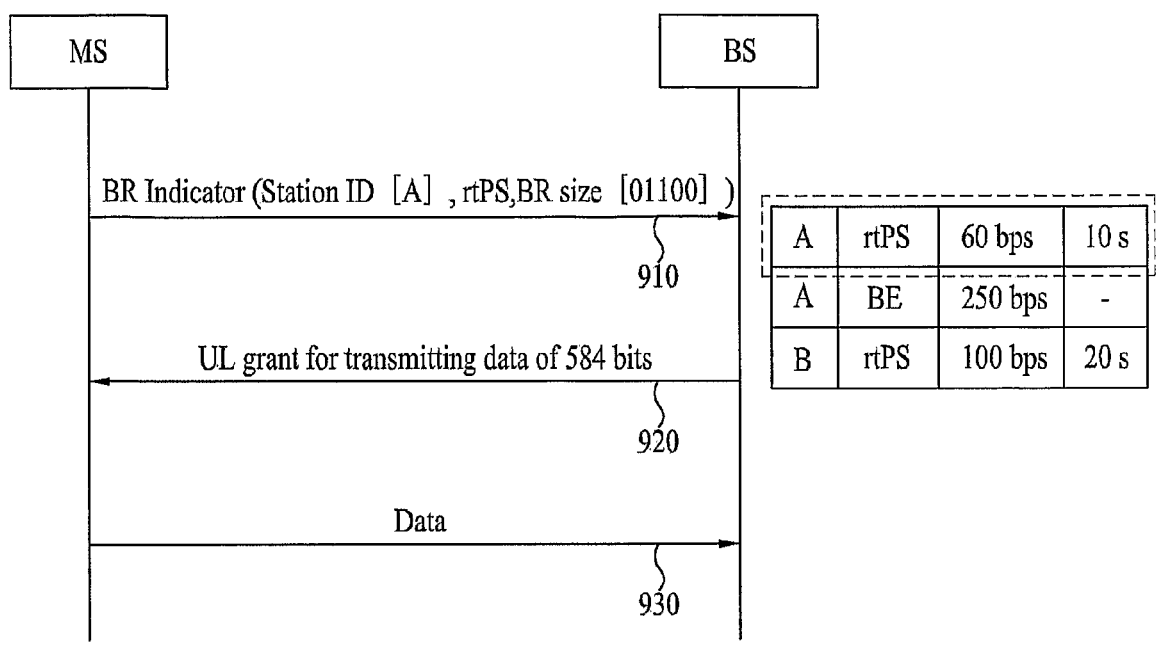
FIG. 9 is a diagram illustrating a signal flow for a UL resource allocation method when a BR size is received along with basic information in the 3-step quick access procedure according to another exemplary embodiment of the present invention.

FIG. 9 is a diagram illustrating a signal flow for a UL resource allocation method when a BR size is received along with basic information in the 3-step quick access procedure according to another exemplary embodiment of the present invention.

Referring to FIG. 9, the MS transmits a BR indicator to the BS to transmit rtPS data in step 910. Upon receipt of the BR indicator, the BS determines connections established for the MS by checking a station ID in the BR indicator. In the illustrated case of FIG. 9, the MS with a station ID of A has a connection with rtPS as a grant scheduling type and a connection with BE as a grant scheduling type. The BS allocates UL resources to the MS using a QoS parameter and a BR size of the former connection (i.e. the rtPS connection).

In FIG. 9, the first bit '0' of [01100] given as the BR size indicates Type 1 and the second bit '1' of [01100] indicates 'Decrease'. It is also assumed that size information is of Type 1 and interpreted by power of 2 expression. Accordingly, the last three bits '100' of means 16 bits.

The BS allocates the MS UL resources corresponding to 584 bits calculated by subtracting 16 bits from an estimated bandwidth size of 600 bits in step 920.

Since 60 bits of data is transmitted per second via the rtPS connection, it may be estimated that 600 bits are transmitted per 10 seconds via the rtPS connection. The MS transmits data through the allocated UL resources in step 930. Herein, a BR size is represented in units of bits. If the measurement unit (e.g. byte or the like) is changed, the BS may allocate UL resources according to the changed measurement unit.

Figure 10:
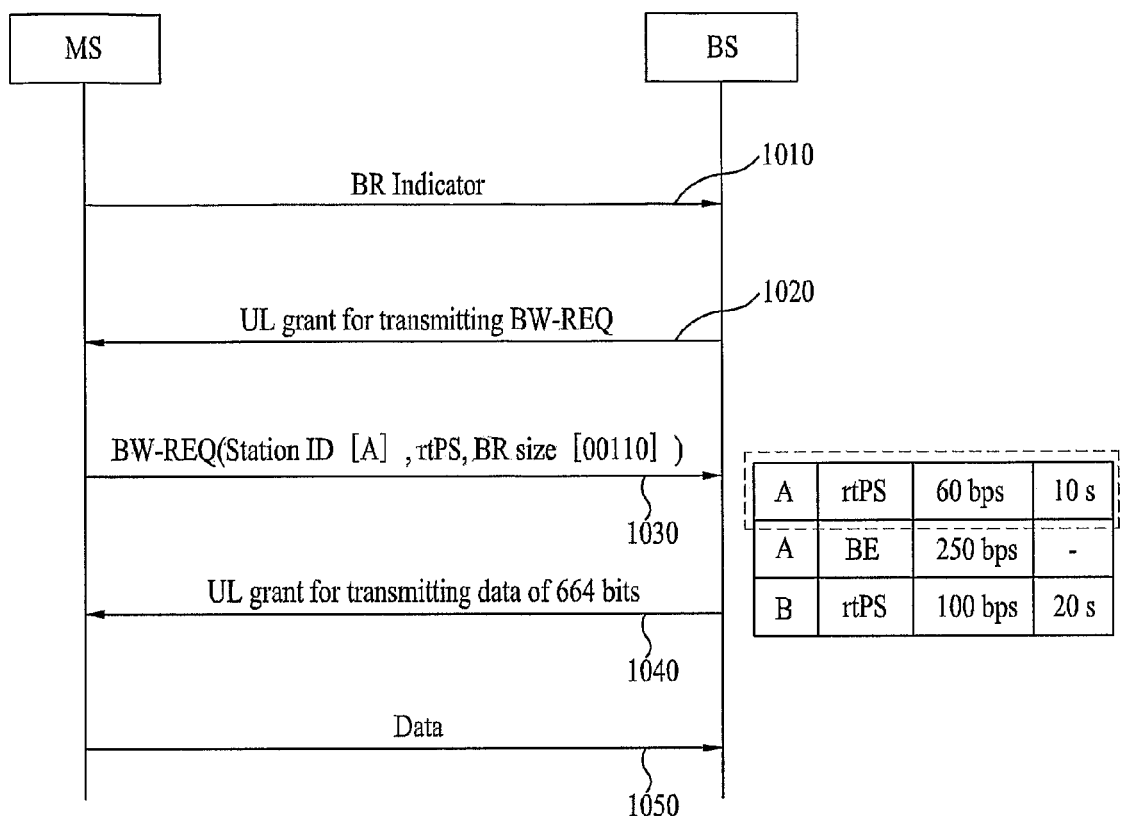
FIG. 10 is a diagram illustrating a signal flow for a UL resource allocation method when a BR size is received along with basic information from an MS in the 5-step regular access procedure according to another exemplary embodiment of the present invention.

FIG. 10 is a diagram illustrating a signal flow for a UL resource allocation method when a BR size is received along with basic information from an MS in the 5-step regular access procedure according to another exemplary embodiment of the present invention.

Referring to FIG. 10, the MS transmits a BR indicator to the BS to request UL resources in step 1010. Upon receipt of the BR indicator, the BS allocates UL resources to the MS, for use in transmission of a BW-REQ message from the MS in step 1020. Then the MS transmits a BW-REQ message through the allocated UL resources to the BS to transmit rtPS data in step 1030. Upon receipt of the BW-REQ message, the BS determines connections established for the MS by checking the station ID of the MS. In the illustrated case of FIG. 10, the MS with a station ID of A has a connection with rtPS as a grant scheduling type and a connection with BE as a grant scheduling type.

The BS allocates UL resources to the MS based on a QoS parameter and a BR size of the rtPS connection in step 1040. In FIG. 10, BR size information is of Type 1 and interpreted by expression for power of 2. The first bit '0' of [00110] given as the BR size indicates Type 1 and the second bit '1' of [00110] indicates 'Increase'. The last three bits '110' of [00110] means 64 bits. Since 60 bits of data is transmitted per second via the rtPS connection, it may be estimated that 600 bits are transmitted per 10 seconds via the rtPS connection. Thus the BS allocates the MS UL resources corresponding to 664 bits calculated by adding 64 bits to the estimated bandwidth size of 600 bits.

The MS transmits data through the allocated UL resources in step 1050. Herein, a BR size is represented in units of bits. If the measurement unit (e.g. byte or the like) is changed, the BS may allocate UL resources according to the changed measurement unit.

Figure 11:
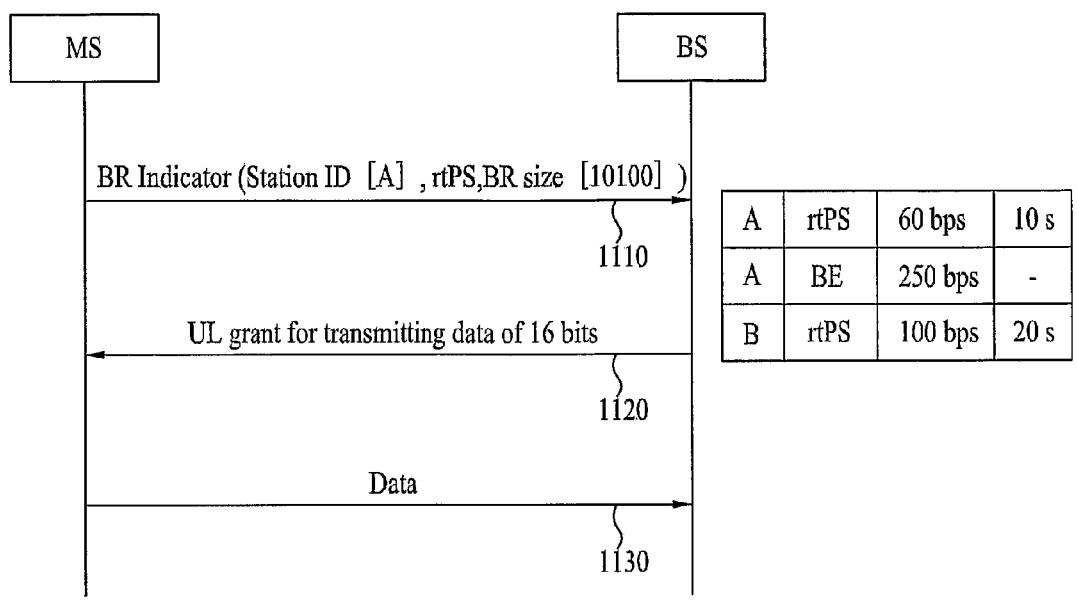
FIG. 11 is a diagram illustrating a signal flow for a UL resource allocation method when a BR size is received along with basic information in the 3-step quick access procedure according to another exemplary embodiment of the present invention.

FIG. 11 is a diagram illustrating a signal flow for a UL resource allocation method when a BR size is received along with basic information in the 3-step quick access procedure according to another exemplary embodiment of the present invention.

Referring to FIG. 11, the BS allocates UL resources only based on received BR size information (Type 2 and power of 2 expression).

The MS transmits a BR indicator to the BS to transmit rtPS data in step 1110. Upon receipt of the BR indicator, the BS allocates UL resources to the MS using a BR size only because the BR indicator has BR size information of Type 2 in step 1120. In FIG. 11, the first bit '1' of [10100] given as the BR size indicates Type 2 and the remaining bits '0100' means 16 bits. Therefore, the BS allocates the MS UL resources corresponding to 16 bits.

The MS transmits data through the allocated UL resources in step 1130. Herein, a BR size is represented in units of bits. If the measurement unit (e.g. byte or the like) is changed, the BS may allocate UL resources according to the changed measurement unit.

Figure 12:
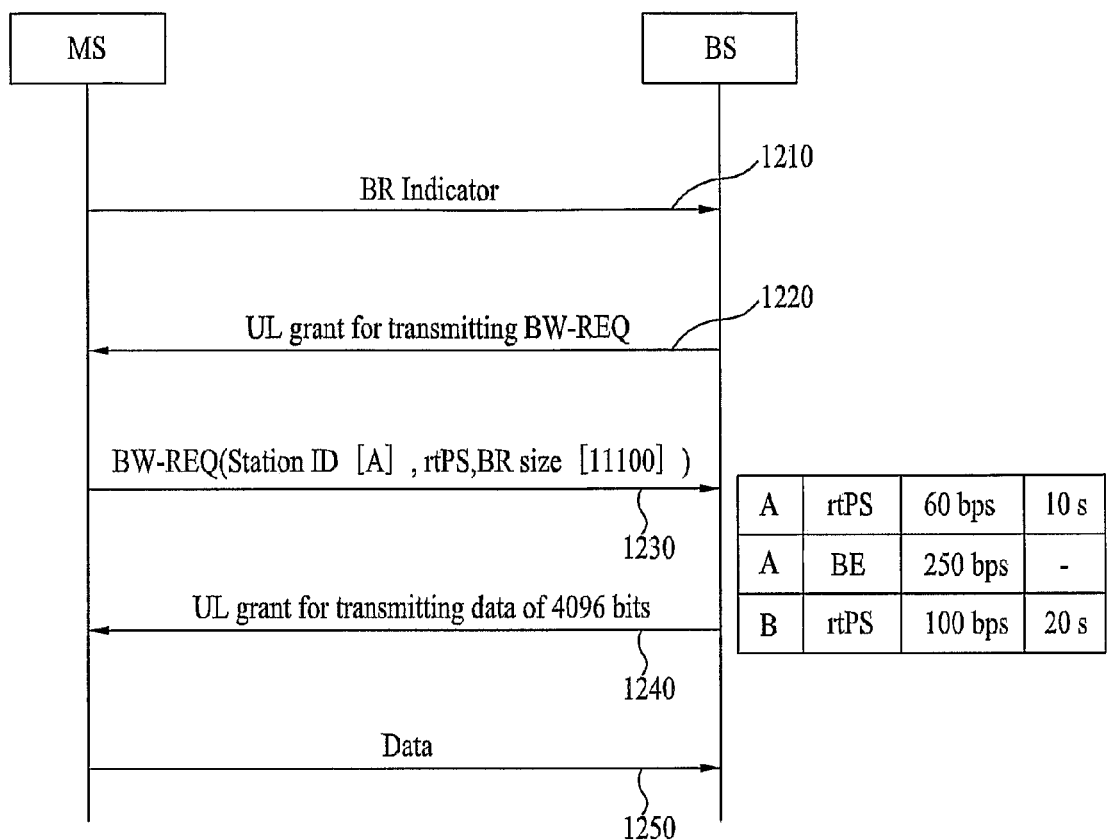
FIG. 12 is a diagram illustrating a signal flow for a UL resource allocation method when a BR size is received along with basic information from an MS in the 5-step regular access procedure according to another exemplary embodiment of the present invention.

FIG. 12 is a diagram illustrating a signal flow for a UL resource allocation method when a BR size is received along with basic information from an MS in the 5-step regular access procedure according to another exemplary embodiment of the present invention.

Referring to FIG. 12, the BS allocates UL resources only based on received BR size information (Type 2 and power of 2 expression).

The MS transmits a BR indicator to the BS to request UL resources in step 1210. Upon receipt of the BR indicator, the BS allocates UL resources to the MS, for use in transmission of a BW-REQ message from the MS in step 1220. Then the MS transmits a BW-REQ message in the allocated UL resources to the BS to transmit rtPS data through step 1230.

Upon receipt of the BR indicator, the BS allocates UL resources to the MS using a BR size only because the BR indicator has BR size information of Type 2 in step 1240. In FIG. 12, the first bit '1' of [11100] given as the BR size indicates Type 2 and the remaining bits '1100' means 4096 bits. Therefore, the BS allocates the MS UL resources corresponding to 4096 bits.

The MS transmits data through the allocated UL resources in step 1250. Herein, a BR size is represented in units of bits. If the measurement unit (e.g. byte or the like) is changed, the BS may allocate UL resources according to the changed measurement unit.

Methods for allocating UL resources by an FFCH according to a further exemplary embodiment of the present invention will be described below.

A dedicated FFCH may be allocated to each MS. Accordingly, the BS may be implicitly aware that information received on each FFCH is feedback information from an MS mapped to the FFCH. Hence, it is not necessary for the MS to transmit its station ID explicitly. Also, one or more scheduling service types may be mapped to codewords, for transmission, as illustrated Table 1 below.

Table 1 illustrates an example of codewords indicating scheduling service types.

TABLE 1

| Codeword | Scheduling Service Type |
|---|---|
| 0 | UGS |
| 1 | rtPS |
| 2 | ertPS |
| 3 | nrtPS |
| 4 | BE |

Referring to Table 1, codeword 0 indicates Unsolicited Grant Service (UGS) as a scheduling service type, codeword 1 indicates rtPS, codeword 2 indicates extended rtPS (ertPS), codeword 3 indicates non-real time Polling Service (nrtPS), and codeword 4 indicates BE.

Table 2 below illustrates another example of codewords indicating scheduling service types.

TABLE 2

| Codeword | Scheduling Service Type |
|---|---|
| 0 | UGS |
| 1 | rtPS |
| 2 | ertPS |
| 3 | nrtPS/BE |

Referring to Table 2, codewords 0, 1 and 2 indicate the same scheduling service types as listed for codewords 0, 1 and 2 in Table 1, and codeword 3 indicates nrtPS or BE. That is, one or more scheduling service types may be mapped to one codeword as illustrated in Table 2.

Figure 13:
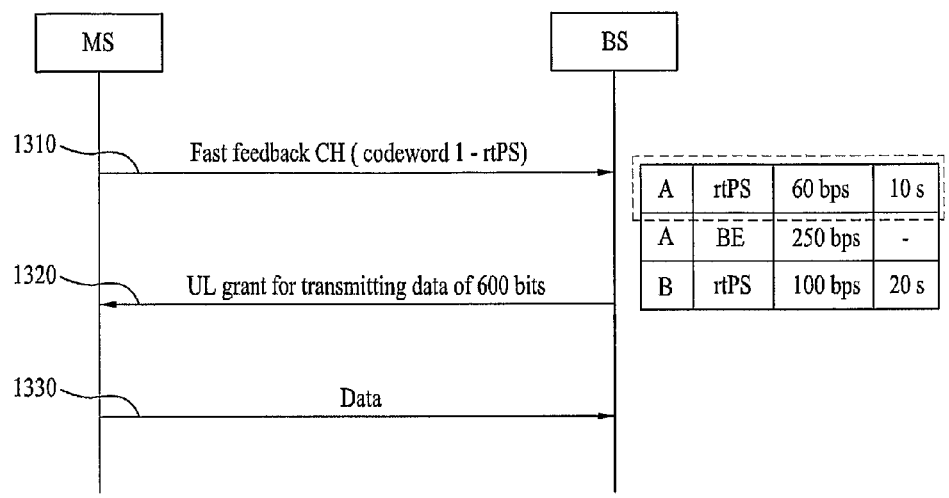
FIG. 13 is a diagram for a signal flow illustrating an exemplary UL resource allocation method according to a further exemplary embodiment of the present invention.

FIG. 13 is a diagram for a signal flow illustrating an exemplary UL resource allocation method according to a further exemplary embodiment of the present invention.

Referring to FIG. 13, the UL resource allocation method is for the case where there is only one connection corresponding to codeword information received on an FFCH. The MS may transmit to the BS codeword 1 mapped to rtPS on a dedicated FFCH allocated from the BS in order to transmit rtPS data in step 1310.

The BS may implicitly find out a station ID mapped to the FFCH by decoding codeword 1 on the FCCH. That is, the BS may determine connections established for the MS according to the FFCH. Therefore, the BS may allocate UL resources to the MS based on QoS parameters of the connections.

In the illustrated case of FIG. 13, the MS has a station ID of A and there exist one rtPS connection and one BE connection for the MS. If a requested grant scheduling type is rtPS, the BS may allocate UL resources to the MS based on an rtPS QoS parameter. Since 60 bits of data is transmitted per second via the rtPS connection, the BS may allocate UL resources through which 600 bits are transmitted per 10 seconds to the MS by a UL grant message in step 1320.

Thus, the MS may transmit data through the allocated UL resources in step 1330.

If there are two or more connections between the MS and the BS, the BS may allocate UL resources to the MS by estimating a resource size in the method illustrated in FIG. 6.

Figure 14:
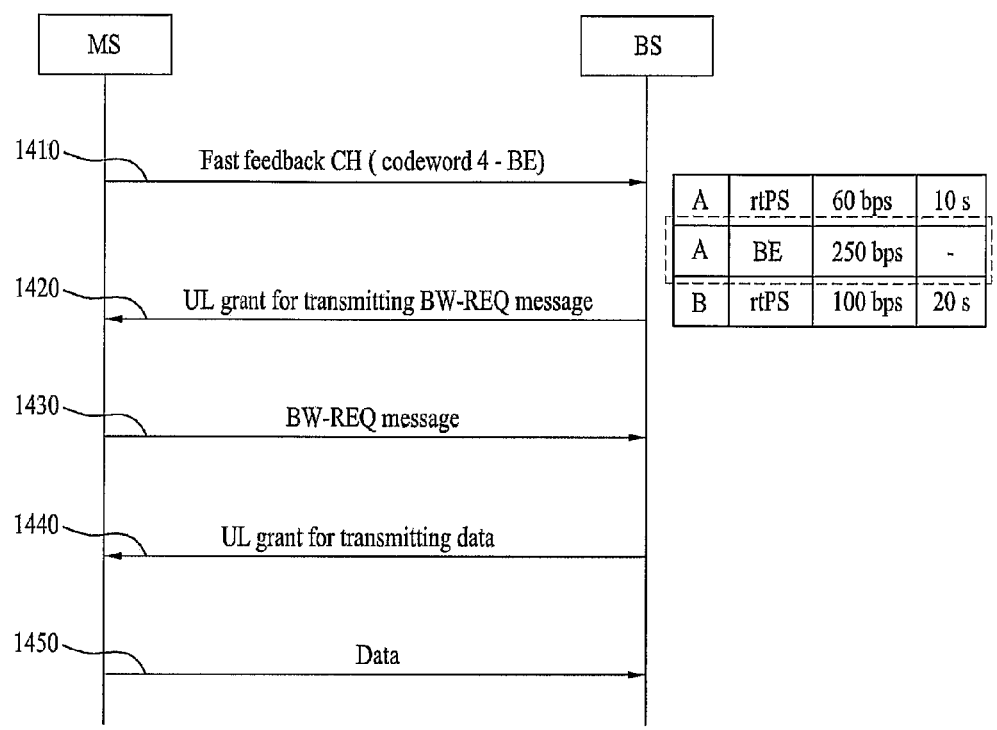
FIG. 14 is a diagram for a signal flow illustrating another exemplary UL resource allocation method according to the further exemplary embodiment of the present invention.

FIG. 14 is a diagram for a signal flow illustrating another exemplary UL resource allocation method according to the further exemplary embodiment of the present invention.

Referring to FIG. 14, the UL resource allocation method is for the case where there is only one connection corresponding to codeword information received on an FFCH. The MS may transmit to the BS codeword 4 mapped to BE on a dedicated FFCH allocated from the BS in order to transmit BE data in step 1410.

Upon receipt of codeword 4 on the FFCH, the BS may implicitly find out the station ID of the MS to which the FFCH was allocated. That is, the BS may determine a connection established for the MS according to the FFCH. If there are not sufficient available resources, the BS may not allocate UL resources of a size estimated using a QoS parameter of the connection. Instead, the BS may allocate UL resources enough to deliver a BW-REQ message to the MS by a UL grant message in step 1420.

The MS may transmit a BW-REQ message to the BS through the allocated UL resources in step 1430.

The BS may allocate UL resources to the MS according to an MS-requested bandwidth by a UL grant message in step 1440 and the MS may transmit data through the allocated UL resources to the BS in step 1450.

Figure 15:
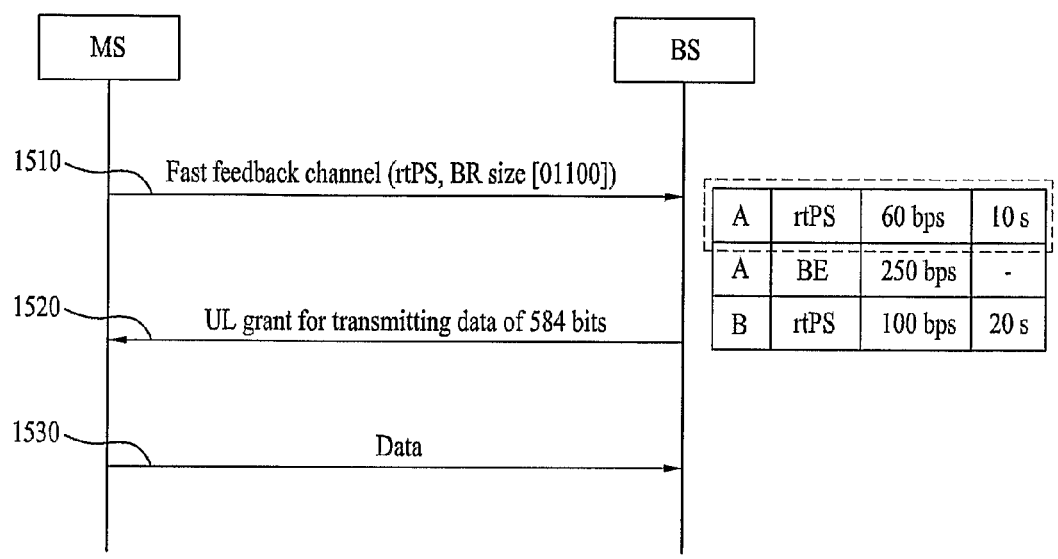
FIG. 15 is a diagram for a signal flow illustrating a further exemplary UL resource allocation method according to the further exemplary embodiment of the present invention.

FIG. 15 is a diagram illustrating a signal flow for a further exemplary UL resource allocation method according to the further exemplary embodiment of the present invention.

Referring to FIG. 15, the BS may receive BR size information along with basic information from the MS on an FFCH.

The MS may transmit to the BS scheduling service type information and BR information on an FFCH allocated by the BS to transmit rtPS data in step 1510.

The BS may be implicitly aware of the station ID of the MS to which the FFCH was allocated by decoding the FFCH. That is, the BS may determine connections established for the MS.

In the illustrated case of FIG. 15, the MS with a station ID of A has a connection with rtPS as a grant scheduling type and a connection with BE as a grant scheduling type. The BS may allocate UL resources to the MS using a QoS parameter and BR information of the rtPS connection.

In FIG. 15, the first bit '0' of [01100] given as the BR information indicates Type 1 and the second bit '1' of is a sign value indicating 'Decrease'. The last three bits '100' of [01100] may mean 16 bits by power of 2 expression (refer to FIG. 8).

The BS may allocate the MS UL resources corresponding to 584 bits calculated by subtracting 16 bits from a bandwidth size of 600 bits estimated using the grant scheduling type and the station ID. That is, the BS may allocate UL resources corresponding to 584 bits to the MS by a UL grant message in step 1520.

The MS may transmit data through the allocated UL resources in step 1530.

Herein, a size indicated by the BR information is represented in units of bits. If the measurement unit (e.g. byte or the like) is changed, the BS may allocate UL resources according to the changed measurement unit.

In the exemplary embodiment of the present invention illustrated in FIGS. 13, 14 and 15, when the MS transmits UL resource request information on an FFCH, the BS should be aware that the information received on the FFCH is UL resource request information, not general information (e.g. Channel Quality Information (CQI), Multiple-Input Multiple-Output (MIMO) feedback, etc.).

To this end, the MS may transmit an indicator indicating that the information transmitted on the FFCH is UL resource request information, along with the UL resource request information. In addition, the MS may determine the transmission period of the UL resource request information and transmit the UL resource request information only at time points determined according to the transmission period.

For the periodic transmission of UL resource request information, the MS preferably shares information about a transmission start time (e.g. an offset or a start frame number) and a transmission period with the BS by a Medium Access Control (MAC) message during a service flow setup.

Table 3 below lists exemplary service flow management encodings to be added. In Table 3, it is preferred that the unit of a BR interval (e.g. 10 ms, 50 ms, . . . ) is determined based on a CQI or ACKnowledgment (MK) transmission interval.

TABLE 3

| Name | Length | Value | Scope |
| --- | --- | --- | --- |
| BR Interval | 2 | Milliseconds | DSA-REQ, DSA-RSP DSC-REQ, DSC-RSP |
| BR Offset | 1 | Count | DSA-REQ, DSA-RSP DSC-REQ, DSC-RSP |
| BR Start Frame Number | 1 | Represents the eight least significant bits of the absolute frame number | DSA-REQ, DSA-RSP DSC-REQ, DSC-RSP |

Referring to Table 3, BR Interval, BR Offset, and BR Start Frame Number may be transmitted and received in a Dynamic Service Addition-REQuest (DSA-REQ) message, a Dynamic Service Addition-ReSPonse (DSA-REQ/RSP) message, a Dynamic Service Change-REQuest (DSC-REQ) message, and a Dynamic Service Change-ReSPonse (DSC-REQ/RSP) message.

Various embodiments have been described in the best mode for carrying out the invention.

The present invention, which pertains to a method for minimizing the overhead of resource request information transmitted for allocation of UL resources, is applicable to a BS, an MS, etc. in systems including IEEE 802.16m, Worldwide interoperability for Microwave Access (WiMAX), etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

The invention claimed is:

1. A method for allocating uplink resources using information of a Bandwidth Request (BR) indicator in a Base Station (BS), the method comprising:
    receiving a BR indicator including a station Identifier (ID), and a Quality of Service (QoS) parameter from a Mobile Station (MS);
    estimating uplink resources based on the BR indicator and allocating the estimated uplink resources to the MS,
    wherein if there are a plurality of connections for the MS, the estimating further comprises deciding one QoS parameter to be used to estimate the uplink resources among a plurality of QoS parameters corresponding to the connections; and
    transmitting information about the allocated uplink resources to the MS through an uplink grant message,
    wherein the BR indicator further includes a BR type field and a BR size field, the BR type field indicating a BR type 1 for increasing or decreasing an amount of the estimated uplink resources by an increment or a decrement indicated by the BR size field, and a BR type 2 for requesting allocation of a desired amount of the uplink resources, and
    wherein if the BR type field indicates the BR type 1, the BR indicator further includes a BR sign field, the BR sign field indicating whether an amount of the estimated uplink resources is needed to be increased by the increment or an amount of the estimated uplink resources is needed to be decreased by the decrement.

2. The method according to claim 1, wherein the estimating comprises re-calculating the amount of the estimated uplink resources using the BR sign field and the BR size field.

3. The method according to claim 1, wherein the estimating comprises:
    if the BR sign field indicates that the amount of the estimated uplink resources is needed to be increased, adding the increment indicated by the BR size field to the amount of the estimated uplink resources, or
    if the BR sign field indicates that the amount of the estimated uplink resources is needed to be decreased, subtracting the decrement indicated by the BR size field from the amount of the estimated uplink resources based on the station ID and the QoS parameter.

4. A method for allocating uplink resources using information of a BandWidth REQuest (BW-REQ) message in a Base Station (BS), the method comprising:
    allocating uplink resources to a Mobile Station (MS), for transmission of a BW-REQ message from the MS, upon receipt of a Bandwidth Request (BR) indicator from the MS;
    receiving a BW-REQ message including a station Identifier (ID), and a Quality of Service (QoS) parameter from the MS;
    estimating uplink resources corresponding to the station ID and the QoS parameter and allocating the estimated uplink resources to the MS,
    wherein if there are a plurality of connections for the MS, the estimating further comprises deciding one QoS parameter to be used to estimate the uplink resources among a plurality of QoS parameters corresponding to the connections; and
    transmitting information about the allocated uplink resources to the MS through an uplink grant message,
    wherein the BW-REQ message further includes a BR type field and a BR size field, the BR type field indicating a BR type 1 for increasing or decreasing an amount of the estimated uplink resources by an increment or a decrement indicated by the BR size field, and a BR type 2 for requesting allocation of desired amount of the uplink resources, and
    wherein if the BR type field indicates the BR type 1, the BR indicator further includes a BR sign field, the BR sign field indicating whether an amount of the estimated uplink resources is needed to be increased by the increment or an amount of the estimated uplink resources is needed to be decreased by the decrement.

5. The method according to claim 4, wherein the estimating comprises re-calculating the amount of the estimated uplink resources using the BR sign field and the BR size field.

6. The method according to claim 4, wherein the estimating comprises:
    if the BR sign field indicates that the amount of the estimated uplink resources is needed to be increased, adding the increment indicated by the BR size field of the BR size field to the amount of the estimated uplink resources based on the station ID and the QoS parameter, or
    if the BR sign field indicates that the amount of the estimated uplink resources is needed to be decreased, subtracting the decrement indicated by the BR size field from the amount of the estimated uplink resources based on the station ID and the QoS parameter.

* * * * *